(12) United States Patent
Mori

(10) Patent No.: US 9,806,788 B2
(45) Date of Patent: Oct. 31, 2017

(54) WIRELESS COMMUNICATION DEVICE AND SIGNAL MEASURING METHOD

(71) Applicant: KABUSHIKI KAISHA TOSHIBA, Minato-ku, Tokyo (JP)

(72) Inventor: Hiroki Mori, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/265,367

(22) Filed: Sep. 14, 2016

(65) Prior Publication Data

US 2017/0180030 A1 Jun. 22, 2017

(30) Foreign Application Priority Data

Dec. 17, 2015 (JP) .................... 2015-246648

(51) Int. Cl.
*H04B 17/00* (2015.01)
*H04B 7/08* (2006.01)
*H04B 17/20* (2015.01)

(52) U.S. Cl.
CPC .......... *H04B 7/0808* (2013.01); *H04B 17/20* (2015.01)

(58) Field of Classification Search
CPC ...... H04B 7/0808; H04B 7/082; H04B 17/20; H04W 4/00
USPC ...... 455/130, 132, 562.1, 575.7, 193.1, 423, 455/67.11, 226.1; 370/334, 329, 345
See application file for complete search history.

(56) References Cited

U.S. PATENT DOCUMENTS

| | | | |
|---|---|---|---|
| 6,850,735 B2 | 2/2005 | Sugar et al. | |
| 7,606,335 B2 | 10/2009 | Kloper et al. | |
| 8,463,222 B2* | 6/2013 | Su | H01Q 3/242 455/13.3 |
| 8,699,425 B2* | 4/2014 | Suda | H04B 7/0417 370/329 |
| 2006/0089103 A1* | 4/2006 | Osburn | H04W 24/00 455/67.13 |

OTHER PUBLICATIONS

"Woods of Knowledge", the Institute of Electronics, Information and Communication Engineers, http://www.ieice-hbkb.org, 2013, with English machine translation, 17 pages.
IEEE Standards Association/IEEE Computer Society: "Part 11: Wireless LAN Medium Access Control (MAC) and Physical Layer (PHY) Specifications", IEEE Std 802.11(™)—2012, The Institute of Electrical and Electronics Engineers, Inc., Mar. 2012, pp. 1-2793.

(Continued)

*Primary Examiner* — Sonny Trinh
(74) *Attorney, Agent, or Firm* — Foley & Lardner LLP

(57) ABSTRACT

According to one embodiment, a wireless communication device includes a receiver configured to receive signals via a plurality of antennas and processing circuitry configured to segment each of signals received by a plurality of antennas into a plurality of elements each defined by a time width and a bandwidth, and measure signal intensities of the elements or groups into which the plurality of elements are divided; select one of the plurality of antennas per element or per group by comparing the signal intensities between the plurality of antennas; and analyze a distribution of the selected antennas to determine an identity of a signal source of the signals.

20 Claims, 14 Drawing Sheets

(56) References Cited

OTHER PUBLICATIONS

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac-2013, The Institute of Electrical and Electronics Engineers, Inc., Dec. 2013, pp. 1-425.
Stacey, Robert: "Specification Framework for TGax", IEEE, 11-15-0132-13-00ax-spec-framework, Intel, Dec. 2015, pp. 1-38.
Stacey, Robert: "Specification Framework for TGax", IEEE, 11-15-0132-17-00ax-spec-framework, Intel, May 2016, pp. 1-61.

* cited by examiner

WIRELESS COMMUNICATION DEVICE AND SIGNAL MEASURING METHOD

CROSS-REFERENCE TO RELATED APPLICATIONS

This application is based upon and claims the benefit of priority from Japanese Patent Application No. 2015-246648, filed Dec. 17, 2015; the entire contents of which are incorporated herein by reference.

FIELD

Embodiments of the present invention relates to a wireless communication device and a signal measuring method.

BACKGROUND

In the case of sensing a broad band, a time-division scan is required because a sensing-enabled bandwidth is restricted to a bandwidth of an Analog-to-Digital Converter (ADC) and a bandwidth of an analog or digital filter. For this reason, it may be difficult to detect a whole distribution of signal intensities from a map (spectrogram) representing frequency power values versus time. For example, such a case is considered that an interference signal is received during reception of a certain signal in a certain bandwidth (a signal is additionally received from another signal source) and then disappears during the reception. At this time, it may be desired to detect that the interference signal is received in the way of the reception of the signal while detect at which part of the reception signal the interference signal is received and at which part of the reception signal the interference disappears. However, in order to do this, performing the sensing of the broad band on a time-division basis and detecting the whole signal distribution at high accuracy causes a difficulty and increases processing load that.

DETAILED DESCRIPTION

According to one embodiment, a wireless communication device includes a receiver configured to receive signals via a plurality of antennas and processing circuitry configured to segment each of signals received by a plurality of antennas into a plurality of elements each defined by a time width and a bandwidth, and measure signal intensities of the elements or groups into which the plurality of elements are divided; select one of the plurality of antennas per element or per group by comparing the signal intensities between the plurality of antennas; and analyze a distribution of the selected antennas to determine an identity of signal source of the signals.

An embodiment of the present invention will hereinafter be described with reference to the drawings.

Figure 1:
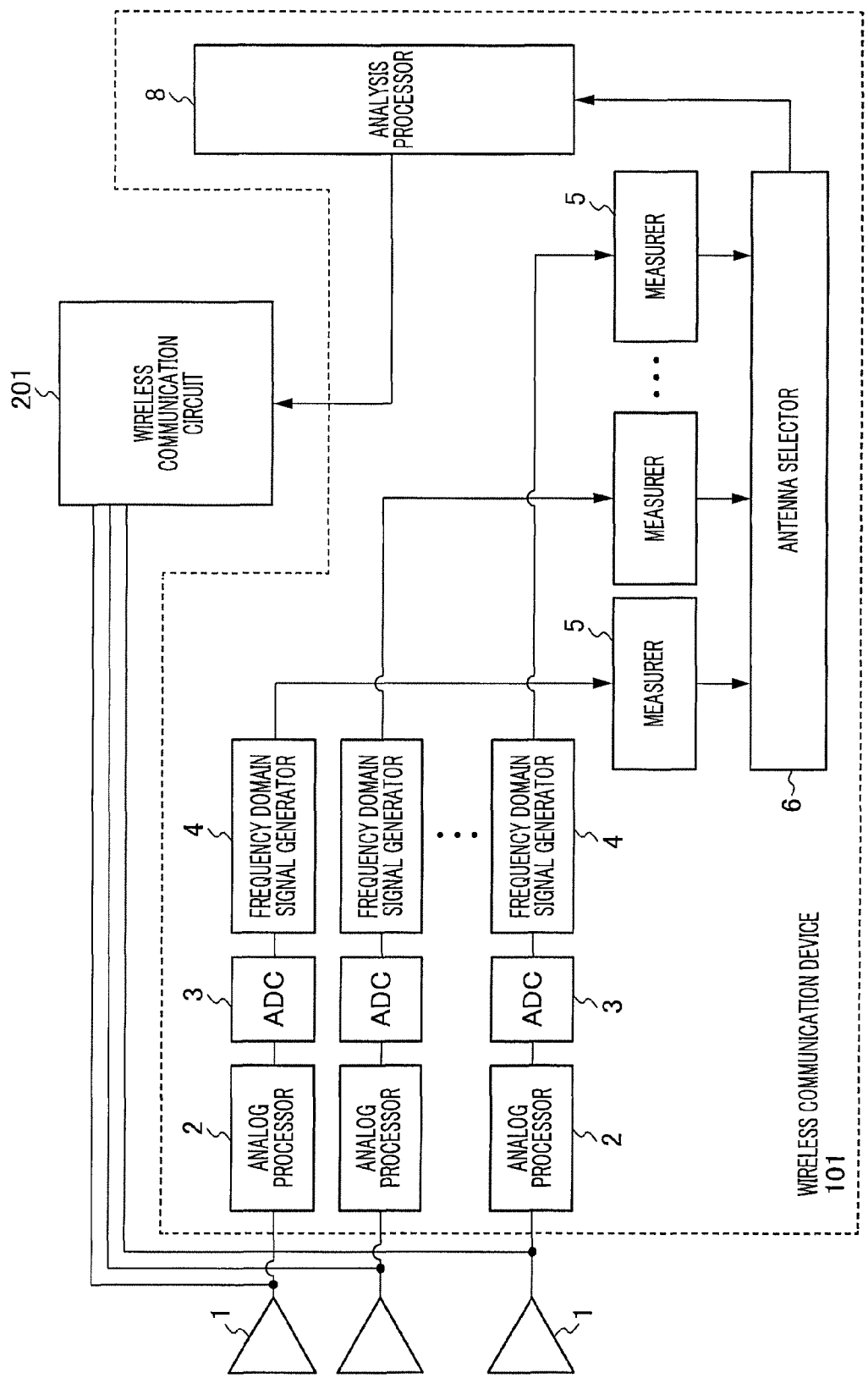
FIG. 1 is a block diagram illustrating a wireless communication system according to an embodiment of the present invention.

FIG. 1 is a block diagram illustrating a wireless communication system according to the embodiment of the present invention. The wireless communication system (or a wireless reception system) in FIG. 1 includes a plurality of antennas 1, a wireless communication device 101, and a wireless communication circuit 201. The wireless communication device 101 includes a plurality of analog processors 2, a plurality of A/D converters 3, a plurality of frequency domain signal generators 4, a plurality of measurers 5, an antenna selector 6, and an analysis processor 8. An assumption is that the present wireless communication device and another wireless communication device serving as a communication partner device are used in a static environment instanced by indoor by way of one example. However, the usage environment is not necessarily limited to such an environment.

Functions of the analog processor 2, the AD converter 3, the frequency domain signal generator 4, the measurer 5, the antenna selector 6 and the analysis processor 8 are implemented by one single integrated circuit or by a plurality of integrated circuits. In the case of being implemented by the plurality of integrated circuits, the functions thereof may be implemented by the integrated circuit of the analog processor 2 and the integrated circuits of the remaining components 4-8, and may also be implemented in modes other than this mode. These components 2-8 and a wireless communication circuit 201 to be described later on may be implemented by the same integrated circuit or by the same chip.

All or part of processes of digital areas of the frequency domain signal generator 4, the measurer 5, the antenna selector 6 and the analysis processor 8, may be executed by software (program) running on a processor instanced by a Central Processing Unit (CPU), may also be executed by hardware, and may further be executed by both of the software and the hardware. Memories to temporarily store data acquired by the processes of the frequency domain signal generator 4, the measurer 5, the antenna selector 6 and the analysis processor 8, are provided within the wireless communication device 101 or in other locations accessible from the wireless communication device 101, whereby the data are transferred and received between these components.

The plurality of antennas 1 receives radio signals, respectively. The radio signals (reception signals) received by the antennas 1 are inputted to the wireless communication device 101 and the wireless communication circuit 201. More specifically, in the wireless communication device 101, the radio signals are inputted to the analog processors 2 corresponding to the antennas 1. The wireless communication circuit 201 performs wireless communication with another wireless communication device in a predetermined communication system via the antenna 1. To give one example, the communication system is, though every communication system is available, exemplified by those pursuant to wireless Local Area Network (LAN) Standard instanced by IEEE802.11 Standard, Bluetooth (registered trademark), WiMAX and WiMAX2. In the case of transmission, the wireless communication circuit 201 transmits the signal having radio frequency corresponding to the communication system via the antenna 1. In the case of the wireless LAN, one of the present wireless communication device and another wireless communication device may be configured as a terminal, and the other may be configured as an access point. The wireless communication circuit 201 includes an analog processing circuit to execute an analog process instanced by amplifying power of the radio signals received by the antenna 1 and converting the frequency (conversion between the radio frequency and a baseband frequency), an A/D converter, a D/A converter, a circuit to execute a communication protocol process, a circuit to manage a communication quality or a communication status, and other equivalent components.

Figure 14:
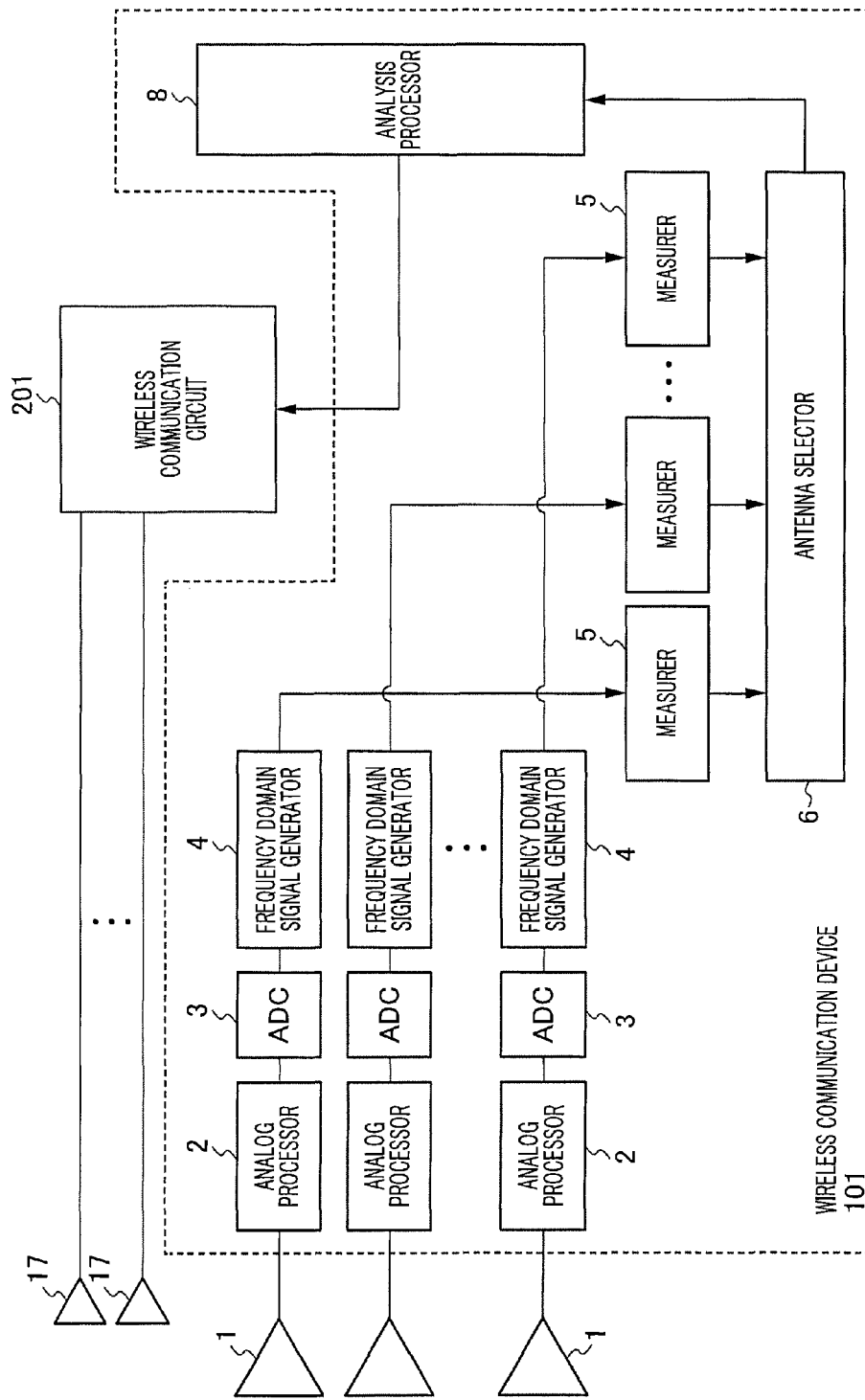
FIG. 14 is a block diagram illustrating another example of a wireless reception system including the wireless communication device according to the embodiment of the present invention.

In the configuration of FIG. 1, the signals received by the antennas 1 are inputted to both of the wireless communication device 101 and the wireless communication circuit 201. However, the antennas may also be used, which are different depending on the wireless communication device 101 and the wireless communication circuit 201. FIG. 14 illustrates a configuration example in this case. The radio signals are inputted to the wireless communication circuit 201 from one or a plurality of antennas 17. The radio signals are inputted to the wireless communication device 101 from the antennas 1.

The plurality of analog processors 2 generates analog signals each having the baseband frequency by executing a power amplifying process and a frequency converting (down-convert) process with respect to the reception signals inputted from the corresponding antennas 1.

The plurality of A/D converters 3 generates digital signals by A/D-converting the analog signals generated by the corresponding analog processors 2.

The plurality of frequency domain signal generators 4 executes a conversion process instanced by Fourier transform into a frequency domain with respect to the digital signals generated by the corresponding A/D converters 3. Frequency domain signals (frequency spectrums) converted into the frequency domain from a time domain of the time domain signals after the A/D conversion, are thereby generated. The frequency domain signals generated by the respective frequency domain signal generators 4 are inputted to the corresponding measurers 5.

The Fourier transform being usable herein encompasses discrete Fourier transform, fast Fourier transform, and short-term Fourier transform. Continuous wavelet conversion, discrete wavelet conversion and discrete cosine transform may be each used as a substitute for the Fourier transform.

Figure 2:
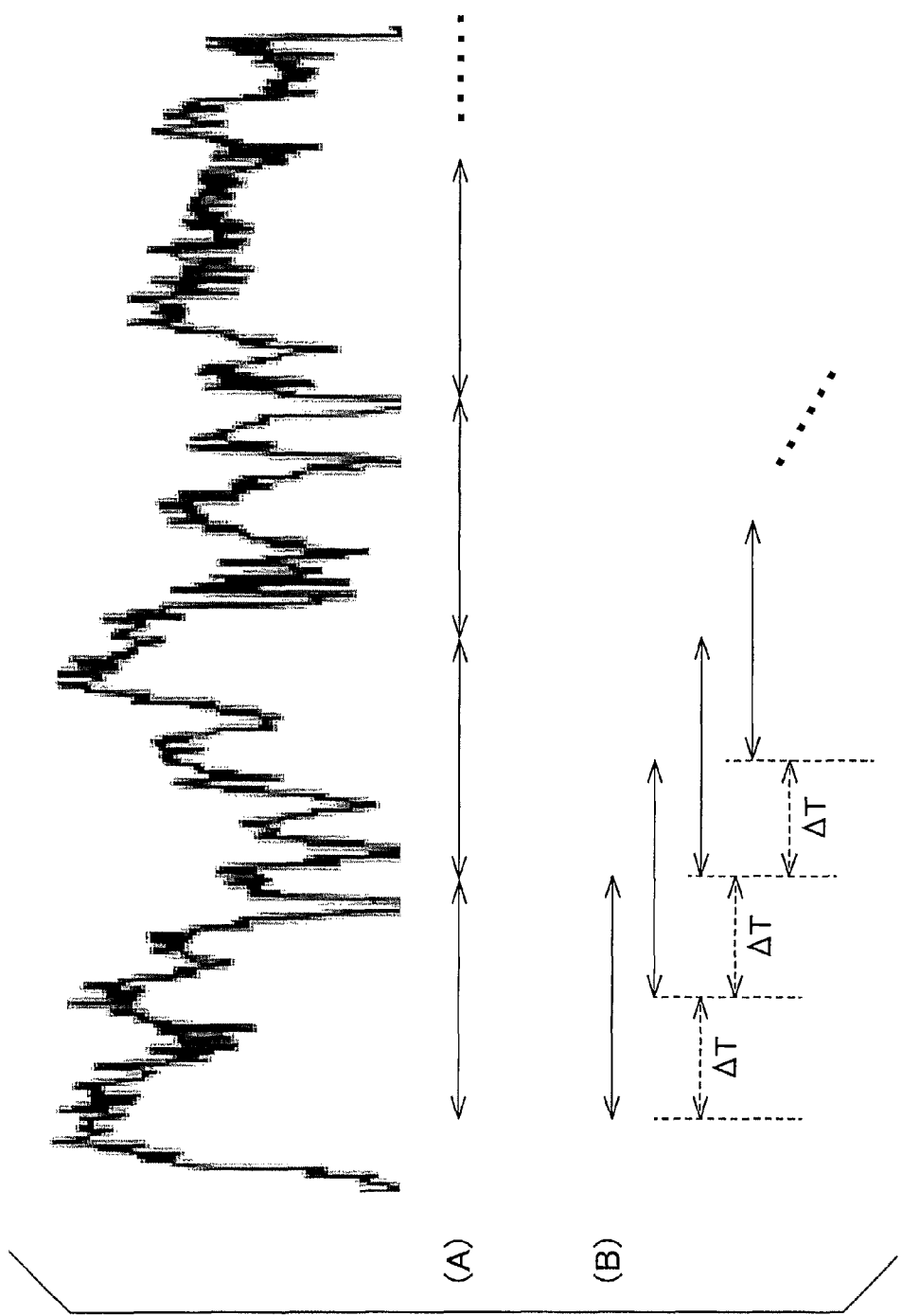
FIG. 2 is diagrams for explaining Fourier transform.

FIGS. 2(A) and 2(B) are explanatory diagrams of the Fourier transform. As depicted in FIG. 2(A), the reception signal may be converted into the frequency domain in every time frame position by shifting a time frame having a fixed time width in a timewise direction stepwise on a time frame width-by-time frame width basis. Alternatively, as depicted in FIG. 2(B), the conversion into the frequency domain may be performed in every time frame position while shifting the time frame in the time-wise direction at an interval of ΔT time, which is shorter than the time frame width, and other methods may also be employed. In other words, it may be sufficient that the respective frequency domain signals are generated by performing the frequency domain conversion sequentially about different frames of the reception signals.

The plurality of measurers 5 measures a signal intensity of each of the frequency domain signals inputted from the corresponding frequency domain signal generators 4. For example, there is measured the signal intensity of each of the plurality of frequency components contained in the frequency domain signals. The following discussion is based on assuming a case of measuring the signal intensity of every frequency component. However, other measuring methods such as measuring collectively the plurality of frequency components are also available. The signal intensity can be expressed by an amplitude level or a power level as one example. The measurer 5 measures the signal intensity each time the frequency domain signal is inputted from the frequency domain signal generator 4.

Note that the measurers 5 and the antenna selector 6 at a subsequent stage may execute the processes targeting at the whole frequency components contained in the frequency domain signals, and may also execute the processes targeting at only the frequency components in part of the range. For example, when the frequency components not used in the wireless communication circuit 201 are predetermined, these predetermined frequency components may be excluded from the processing target. The processing may be carried out targeting at the whole time widths of the reception signal, and may also be carried out targeting at only the signal of part of the whole time width.

Herein, frequency indices b (=1, . . . , B) are allocated to a plurality of bandwidths into which a frequency bandwidth of the frequency domain signal is segmented in a frequency direction. Each of the bandwidths allocated with the frequency indices contains one or a plurality of frequency components. It may also be permitted that the bandwidth containing none of the frequency components exists. The respective bandwidths acquired by the segmentation may have the same size, and the frequency bandwidth may also be segmented into the bandwidths of different sizes. In the embodiment, the frequency bandwidth is to be segmented into the bandwidths of the same size.

Time indices s (=1, . . . , S) are allocated to the respective frequency domain signals, corresponding to time periods thereof. A signal indicated by the frequency index b in the frequency domain signal of the time index s is expressed by y(b, s).

Further, a signal indicated by the frequency index b in the frequency domain signal of the time index s, which is received by an n-th (n=1, . . . , N) antenna of the plurality of antennas 1, is expressed by yn(b, s).

Herein, a tuple of the frequency index b and the time index s is called an element (which is expressed by E(s,b)). The measurer 5 measures the signal intensities of the elements or the groups into which the plurality of elements is divided. When using a matrix with horizontal components being set as the time indices and with vertical components being set as the frequency indices, one frequency domain signal corresponds to one time index and the plurality of frequency indices. Cells of the matrix correspond to the respective elements.

Figure 3:
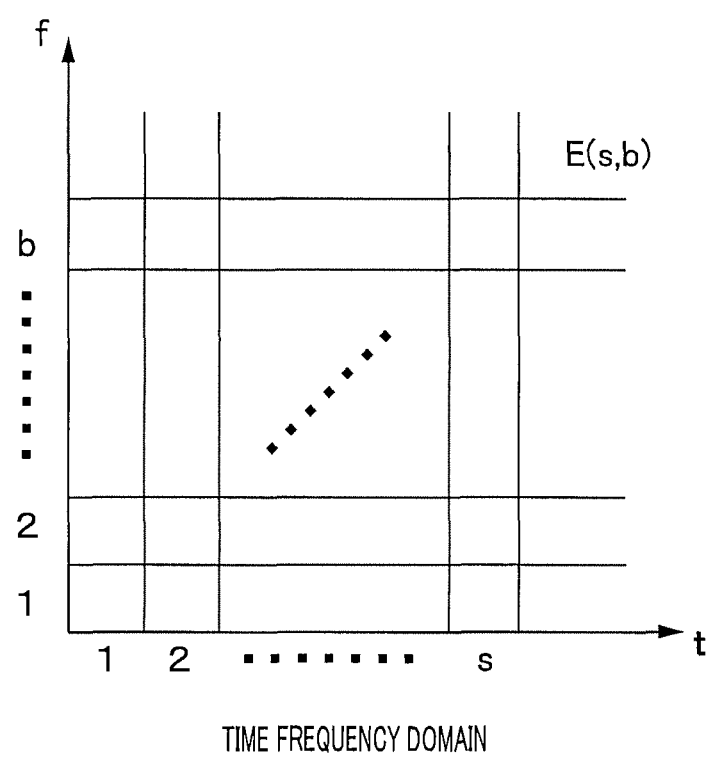
FIG. 3 is a diagram illustrating a matrix, in which time indices are taken along the axis of abscissas, and frequency indices are taken along the axis of ordinates.

FIG. 3 illustrates an example of schematically expressing the matrix, in which the time indices are taken along the axis of abscissas, and the frequency indices are taken along the axis of ordinates. The time indices 1, 2, . . . are taken along the axis of abscissas, while the frequency indices 1, 2, . . . are taken along the axis of ordinates. The respective elements are schematically expressed by rectangular cells. Note that the frequency domain signals for the plurality of time indices are generically termed a time frequency signal as the case may be. A coordinate system with the frequency indices being taken along the axis of ordinates and the time indices being taken along the axis of abscissas, is called a time frequency domain as the case may be.

Herein, P(s,b) represents a signal intensity of the element E(s,b). The signal intensity P(s,b) may involve using the amplitude level or the power level, and the signal intensity P(s,b) of the signal y(s,b) in each element can be expressed by, e.g., the following mathematical expression (1) or (2).

[Mathematical Expression 1]

$$P(s,b)=|y(s,b)| \text{(case of using amplitude level)} \quad (1)$$

$$P(s,b)=|y(s,b)^2| \text{(case of using power level)} \quad (2)$$

When the element contains the plurality of frequency components, a total, an average, a maximum value or a median of the signal intensities of the frequency components calculated in the mathematical expression given above, can be calculated as the signal intensity of the element. Note that these mathematical expressions (1) and (2) are exemplifications, and the method of calculating the signal intensity is not limited to these mathematical expressions.

The signal intensities, measured by the measurer 5 of the elements, of the frequency domain signal are inputted to the antenna selector 6. The measurer 5 may output a measurement result (signal intensity) to the antenna selector 6 whenever measuring one frequency domain signal, and may also output batchwise the measurement results to the antenna selector 6 whenever completing the measurements of the frequency domain signals for a fixed number of time indices.

The antenna selector 6 compares the signal intensities of the elements in the same positions between the antennas by using the measurement results for the fixed number of time indices, which are acquired from the respective measurers 5. The elements in the same position connote the elements each having the same time index and the same frequency index. The antenna selector 6 selects, based on a result of the comparison, one antenna according to a predetermined paradigm per element in the same position. For example, the antenna selector 6 selects the antenna having the maximum signal intensity. The antenna selector 6 may also select the antenna, of which the signal intensity is equal to or larger than a predetermined value, as another example. In this case, the plurality of antennas may be selected. The antenna 1 exhibiting the second or third largest signal intensity may also be selected. It is also effective to select the antenna exhibiting the minimum signal intensity. The present embodiment is based on the assumption that the antenna exhibiting the maximum signal intensity is selected.

An operational example of the antenna selector 6 will be described by use of FIGS. 4 and 5.

Figure 4:
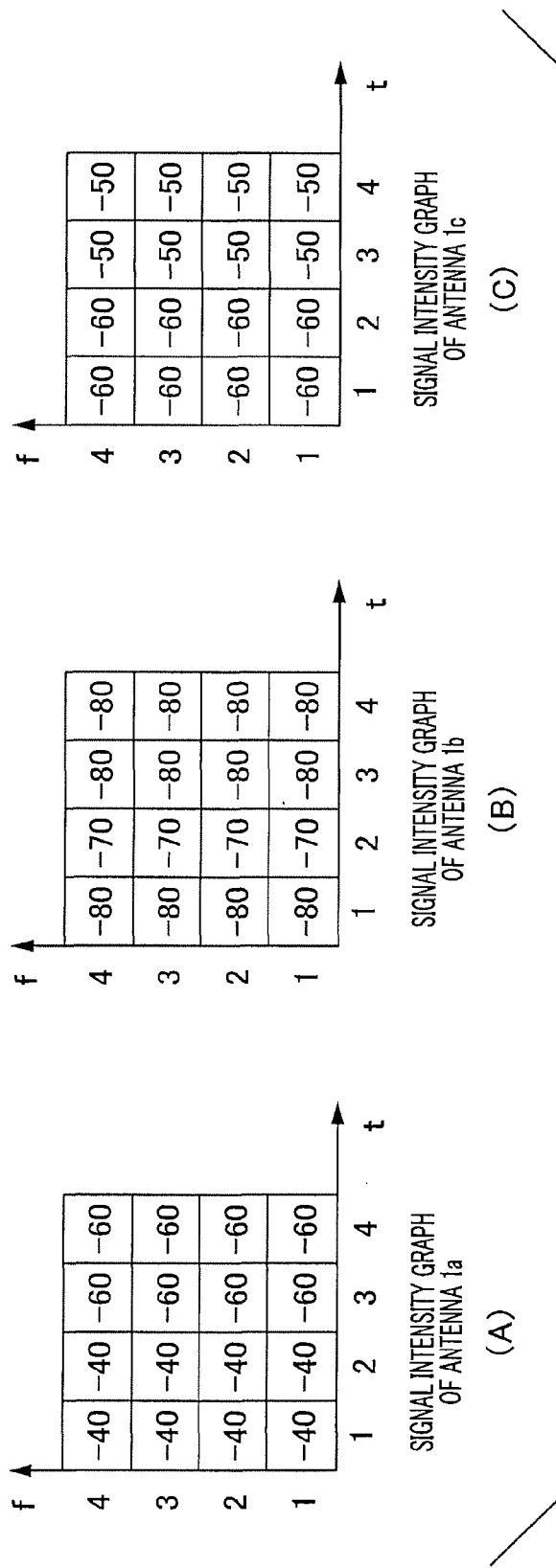
FIG. 4 shows diagrams illustrating maps representing signal intensities of respective elements per antenna.

FIG. 4 illustrates maps of the three antennas 1, in which the signal intensities of the respective elements are expressed on the time frequency domain. The three antennas 1 are designated by antennas 1a, 1b and 1c, respectively. Sixteen elements E(1,1) through E(4,4) are depicted per antenna in a range defined by the time indices 1-4 and by the frequency indices 1-4. The signal intensities of the elements are plotted in cells representing the respective elements. The processing is carried out by using the frequency domain signals for the plurality of time indices in this example, and can also be executed by using the frequency domain signal for one time index.

The antenna selector 6 selects the antenna exhibiting the largest signal intensity in all of the antennas 1 with respect to the elements E(1,1) through E(4,4). Demonstrated is an example of selecting the antenna with respect to the element E(4,4). The signal intensity of the element E(4,4) of the antenna 1a is −60 dB as depicted therein. Similarly, the signal intensities of the elements E(4,4) of the antennas 1b, is are −80 dB and −50 dB, respectively. Hence, the antenna exhibiting the maximum signal intensity is the antenna is with the signal intensity being −50 dB. Accordingly, the antenna selector 6 selects the antenna is with respect to the element E(4,4). The antenna selector 6 executes these processes with respect to all of the elements E(1,1) through E(4,4), thereby electing one antenna from the antennas 1a-1c with respect to each element E.

FIG. 5(A) illustrates a selected antenna map, in which identifiers of the antennas selected with respect to the elements are plotted on the time frequency domain. An identifier of the antenna 1a is designated by "a", an identifier of the antenna 1b is designated by "b", and an identifier of the antenna 1c is designated by "c". In the time indices 1, 2, the antenna 1a is selected in all of the elements. In the time indices 13, 4, the antenna 1b is selected in all of the elements. FIG. 5(B) illustrates a map (signal intensity map), in which the signal intensities (i.e., the maximum signal intensities of the respective elements) of the antennas selected with respect to the elements, are plotted on the time frequency domain.

Figure 5:
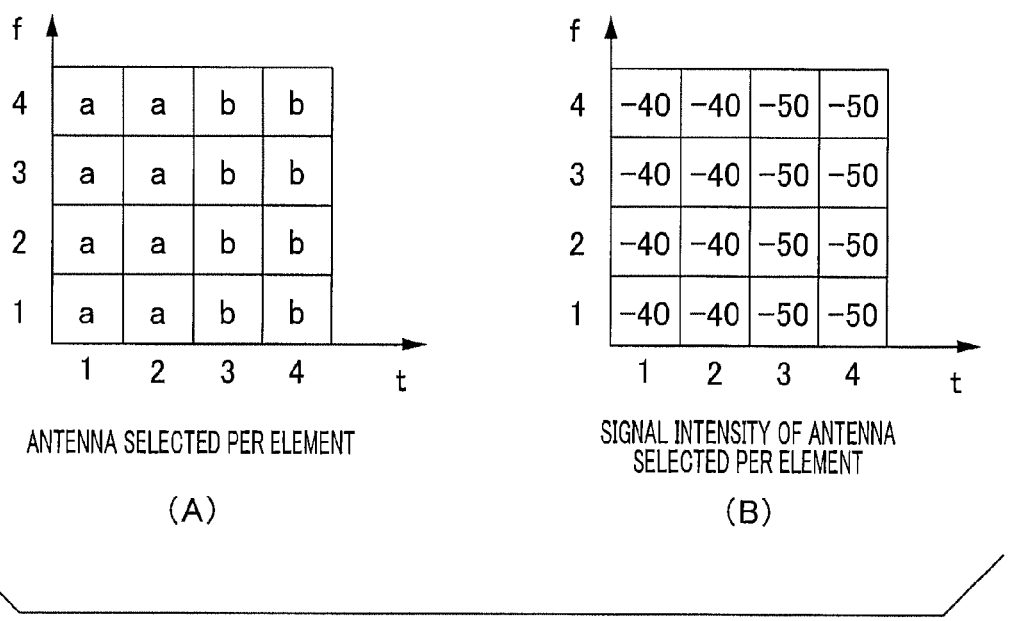
FIG. 5 shows diagrams illustrating a selected antenna map and a signal intensity map, in which identifiers and signal intensities of the selected antennas are plotted with respect to the elements.
Figure 6:
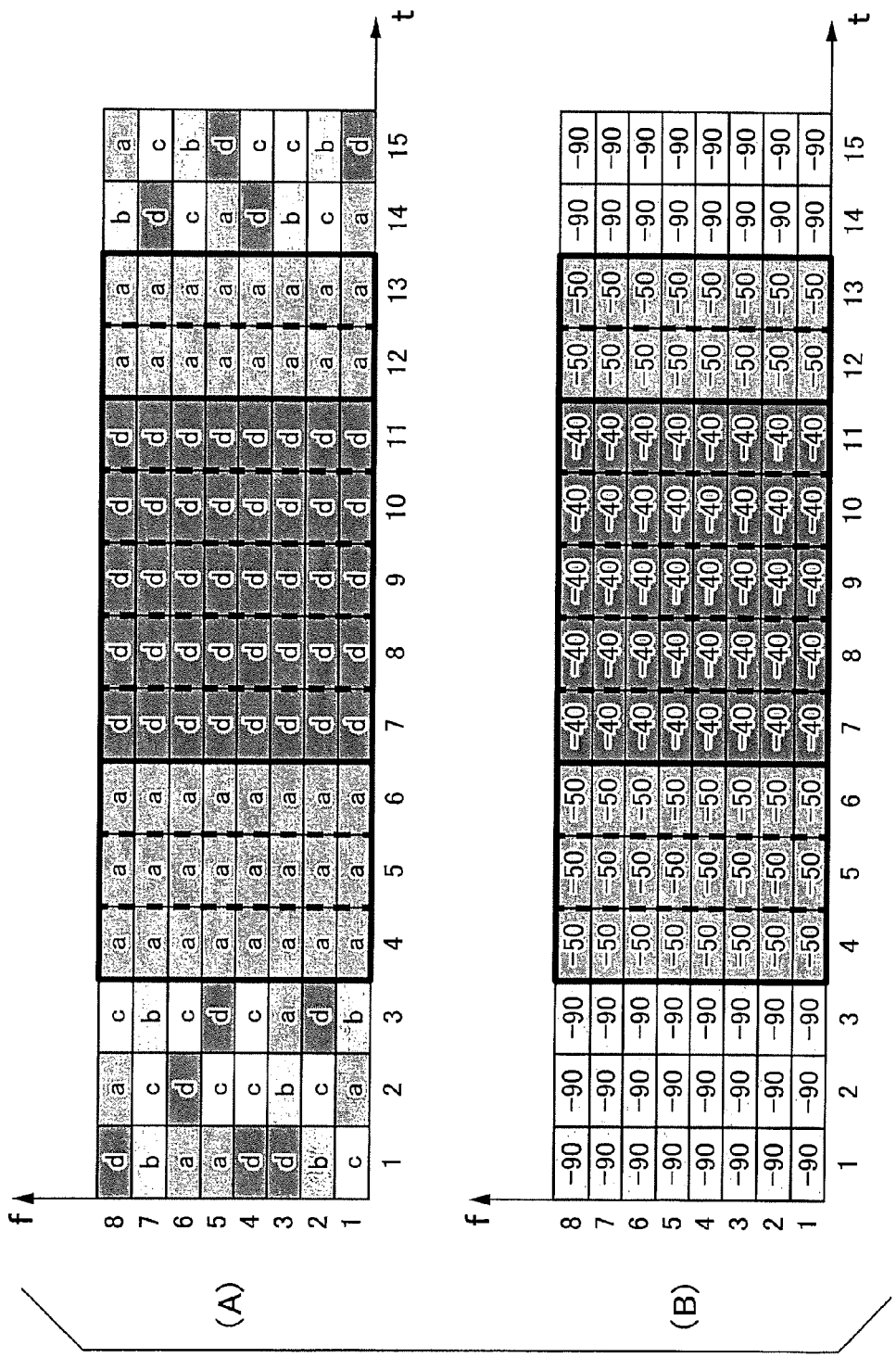
FIG. 6 shows diagrams illustrating another example of each of the selected antenna map and the signal intensity map.

FIG. 6 illustrates a selected antenna map and a signal intensity map according to an example different from FIGS. 4 and 5. In the examples of FIGS. 4 and 5, the number of time indices is "4", and the number of frequency indices is "4". However, in the example of FIG. 6, the number of time indices is "15", and the number of frequency indices is "8". The four antennas 1a, 1b, 1c, 1d are used as the plurality of antennas. The identifiers of these antennas are designated by "a", "b", "c" and "d".

The analysis processor 8 executes an analysis process for determining an identity of a signal source of the reception signals by using at least the selected antenna map in the selected antenna map (antenna selected result per element) and the signal intensity map (maximum signal intensity of the element). An example of having no identity of the signal source is exemplified by an increased number of signal sources, a decreased number of signal sources and a change of the signal source to another signal source. The analysis process may further detect and utilize at least one of the bandwidth, a central frequency and reception power (which is herein the reception power not of every element but of the whole bandwidth) of the reception signals. An in-depth description thereof will be made later on.

An operational example of the analysis processor 8 will hereinafter be described.

First Example

It is checked whether the antenna identifiers are coincident (i.e., whether the selected antennas are coincident) by comparing the antenna identifiers between the elements corresponding to a certain time index X and a next time index X+1 by using the selected antenna map, and a number of elements with the antenna identifiers not being coincident, is counted. When the number of non-coincident elements is equal to or larger than a threshold value, it is determined that there is no identity between the signal source of the reception signal specified by the time index X and the signal source of the reception signal specified by the time index X+1. When the number of non-coincident elements is smaller than the threshold value, it is determined that there is the identity (the signal source is the same) between the signal source of the reception signal specified by the time index X and the signal source of the reception signal specified by the time index X+1.

No identity of the signal source means that [1] the number of signal source of the reception signals increases (e.g., a case of receiving also the signal from a second signal source in addition to a first signal source), [2] the number of signal source of the reception signals decreases (e.g., a case of only the first signal source after the transmission from the second signal source ends when the signals from the first and second signal sources are received), or [3] the signal source of the reception signals changes to another signal source (e.g., a signal transmission source changes to the second signal source from the first signal source).

In the example of FIG. 6A, all of the elements have the same antenna identifier in the time indices 4-6, and it is therefore determined that the reception signals of the time indices 4-6 come from the same signal source. The number of elements with the antenna identifiers not being coincident between the time indices 6 and 7 is "8", and this element count "8" is equal to or larger than a threshold value when the threshold value is set to "7". Hence, the determination is that the signal source has no identity between the time indices 6 and 7. All of the elements have the same antenna identifier in the time indices 7-11, and it is therefore determined that the reception signals of the time indices 7-11 come from the same signal source. The number of elements with the antenna identifiers not being coincident between the time indices 11 and 12 is "8", and the element count "8" is equal to or larger than the threshold value (which is herein "7"), and hence it is determined that the signal source does not have the identity between the time indices 11 and 12. Note that the number of non-coincident elements is "8" (larger than the threshold value) both between the time indices 1, 2 and between the time indices 2, 3. The antenna identifiers are arranged in a patchy fashion without being largely biased to a specific antenna identifier in each of the time indices 1-3. The reception signals of the time indices 1-3 can be therefore determined to be noise signals. The reception signals of the time indices 14, 15 can be likewise determined to be the noise signals. The determination of whether arranged in the patchy fashion may include making a determination of being arranged in the patchy fashion when, e.g., the same antenna identifiers are not consecutively arranged in the frequency direction (in the vertical direction along the sheet surface) over a fixed number of elements. Alternatively, the determination may also be made based on a spatial frequency (e.g., the lowest spatial frequency (zero or other equivalent values) occurs in the case of the entire identifiers being the same).

Note that it may also be determined whether the number of elements with the antenna identifiers being coincident is equal to or smaller than the threshold value in place of determining whether the number of elements with the antenna identifiers not being coincident is equal to or larger than the threshold value.

Second Example

The determination is made based on only the selected antenna map in the first example. However, a more specific or higher accurate determination may also be made by further using a signal intensity map. In the first example, the signal source are determined not to have the identity when the number of elements with the antenna identifiers not being coincident between the time indices is equal to or larger than the threshold value. However, in addition to this, a condition that the bandwidth or the reception power or the central frequency or a plurality of these values is the same or approximate, may be added as a condition that there is no identity of the signal source.

A determination of whether the bandwidth is the same or approximate may be made based on whether a size of the range of the elements each having the power intensity equal to or larger than a fixed value (e.g., −80 dB) is the same or approximate. In FIG. 6(B), in each of the time indices 4-13, the range of the elements each having the signal intensity equal to or larger than the fixed value encompasses the elements 1-8, and the size of the range is equivalent to "8" as the element count. Accordingly, the bandwidth can be determined to be the same in each of the time indices 4-13. The bandwidth may be determined to be approximate between such time indices that a difference between the sizes of the element ranges is within the fixed value.

The central frequency corresponds to a central frequency of the bandwidth. The central frequency may be determined to be approximate between such time indices that a difference between the central frequencies is within a fixed value.

The reception power may involve using a total value, an average value, a median and a maximum value of the signal intensities of the elements belonging to the element range corresponding to the bandwidth, and a power value of the central frequency within the element. The signal intensity is −50 dB in each of the elements in the time indices 4-6, 12 and 13, and the reception power in the time indices 4-6, 12 and 13 can be determined to be the same. The signal intensity is −40 dB in the time indices 7-11, and the reception power in the time indices 7-11 can be determined to be the same. The reception power may also be determined to be approximate between such time indices that a difference in total or average between the signal intensities is within a fixed value.

Figure 7:
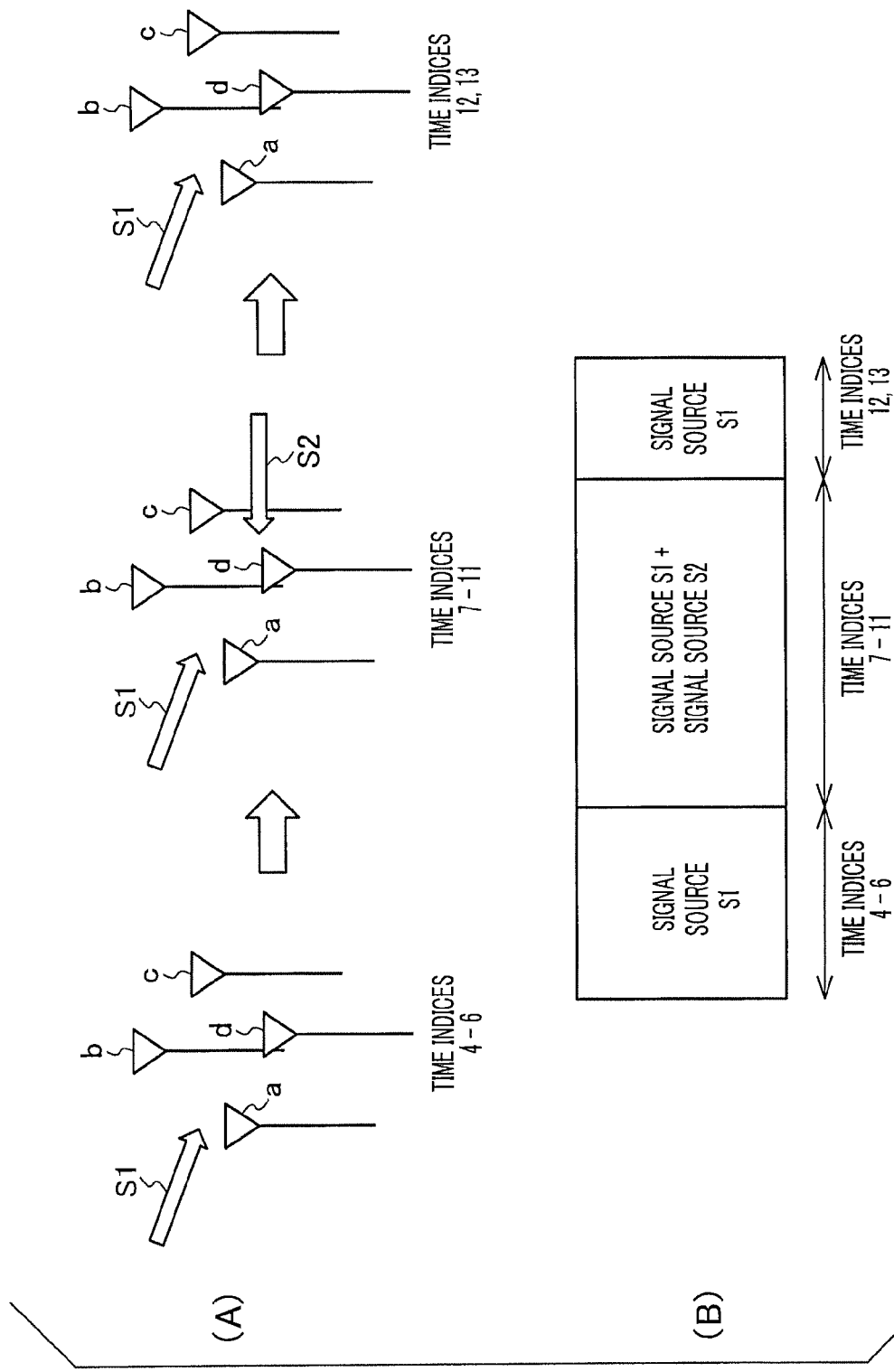
FIG. 7 shows diagrams illustrating how a signal reception state transitions.

After detecting in the manner described above that the signal source has no identity, it may also be concretely specified whether the signal source increase or decrease in number or changes to another signal source. In FIG. 6(B), the reception power (the average is −50 dB) in the time indices 4-6 is the same as the reception power in the time indices 12 and 13, but is smaller than the reception power (the average is −40 dB) of the time indices 7-11. It can be determined, based on this point and the selected antenna map, that the signal (interference signal) is received from another signal source together with the signal from the signal source S1 in the time indices 7-11, and that the interference signal disappears from the time index 12 onward. FIG. 7(A) schematically depicts how this state transitions. FIG. 7(A) depicts how the signal is received from the signal source (signal source S1) defined as a communicating destination, and the interference signal coming from another signal source (which is assumed to be a signal source S2) is added on a halfway line and thereafter disappears. FIG. 7(B) depicts how the signal source of the reception signal increases and decreases in number. In the static environment instanced by indoor, as far as the terminal mounted with the wireless communication device according to the embodiment does not move or a large change does not occur in the ambient environment, the antenna to be selected may be basically deemed the same. Accordingly, when the same antenna is selected in different periods of time and a different antenna is selected for a period of time between the different periods of time and the reception power of the period of time becomes larger than those in the different periods of time, it can be considered that a new interference source (signal source) occurs during this period of time.

It can be also determined, as another determination method, corresponding to the environment in which to dispose the terminal or the communication system to be used that the signal source changes to the signal source S2 from the signal source S1 in the time indices 7-11 (the signal coming from the signal source S1 is not received in the time indices 7-11) but returns to the signal source S1 from the time index 12 (alternatively, further changes to still another signal source). On this occasion, when the reception power in the time indices 7-11 is larger than in the time indices 4-6, 12, 13 and when a difference therebetween is equal to or larger than the threshold value, it can be also determined that the interference signal from another signal source (signal source S2) is added, and that the signal source S1 is replaced by another signal source (signal source S2) when smaller than the threshold value.

The signal intensities in the signal intensity map may use round-off values obtained by rounding calculation.

Figure 8:
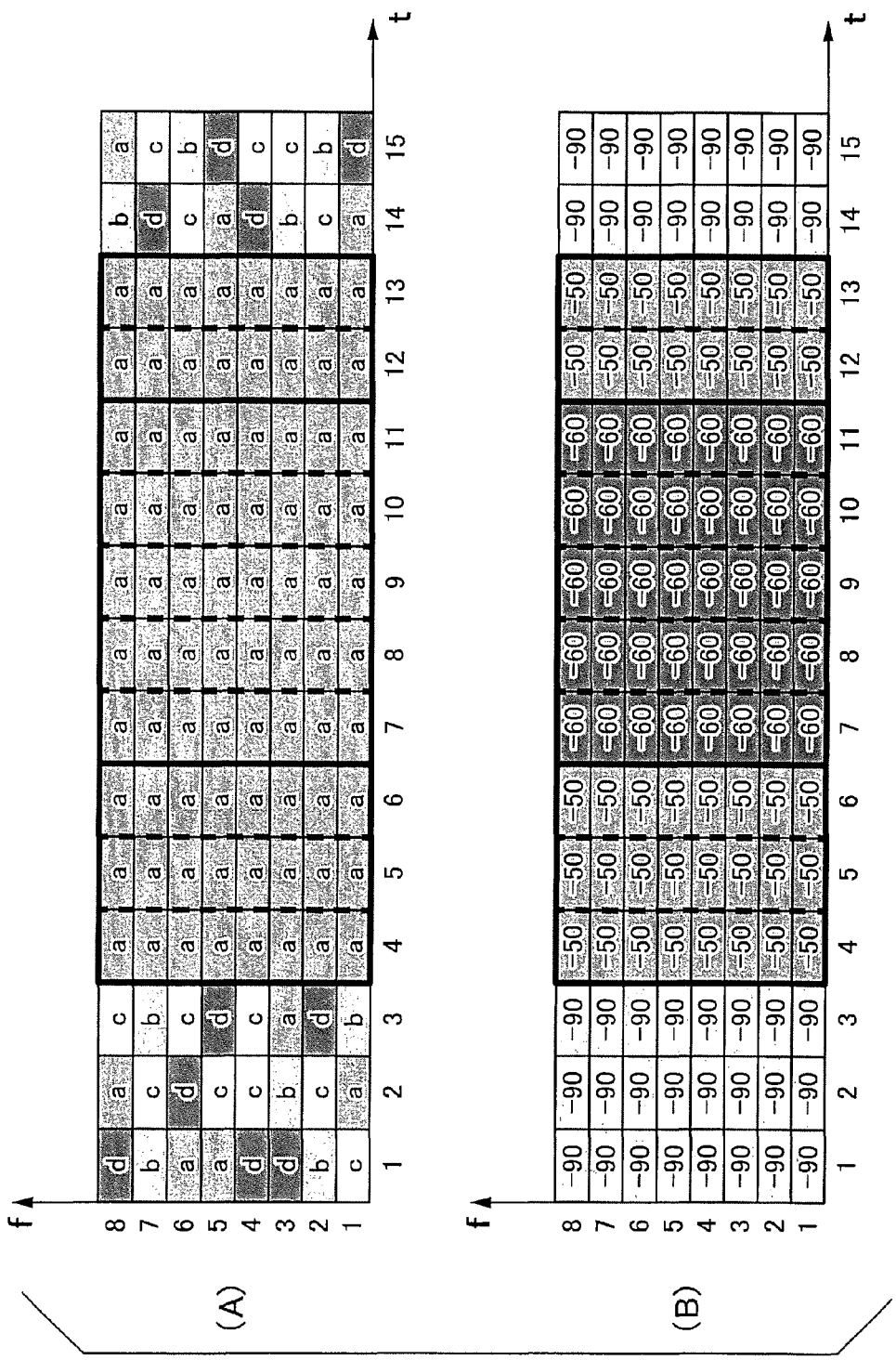
FIG. 8 shows diagrams illustrating still another example of each of the selected antenna map and the signal intensity map.

FIGS. 8(A) and 8(B) illustrate still another example of each of the selected antenna map and the signal intensity map. As illustrated in FIG. 8(A), the same antenna 1a as the antenna in the time indices 4-6, 12, 13 is selected in all of the elements in the time indices 7-11. As illustrated in FIG. 8(B), the signal intensity is −60 dB in all of these elements, and this value is smaller than −50 dB in the time indices 4-6, 12, 13. Others are the same as in FIGS. 6(A) and 6(B). Accordingly, in the time indices 7-11, the identity of the signal source is maintained with respect to the time indices 4-6, 12, 13. However, the reception power can be determined to decrease due to fading. It is considered that the fading is derived from attenuation of radio waves due to an event that a dielectric body instanced by a human body passes by the terminal, and other equivalent causes.

Figure 9:
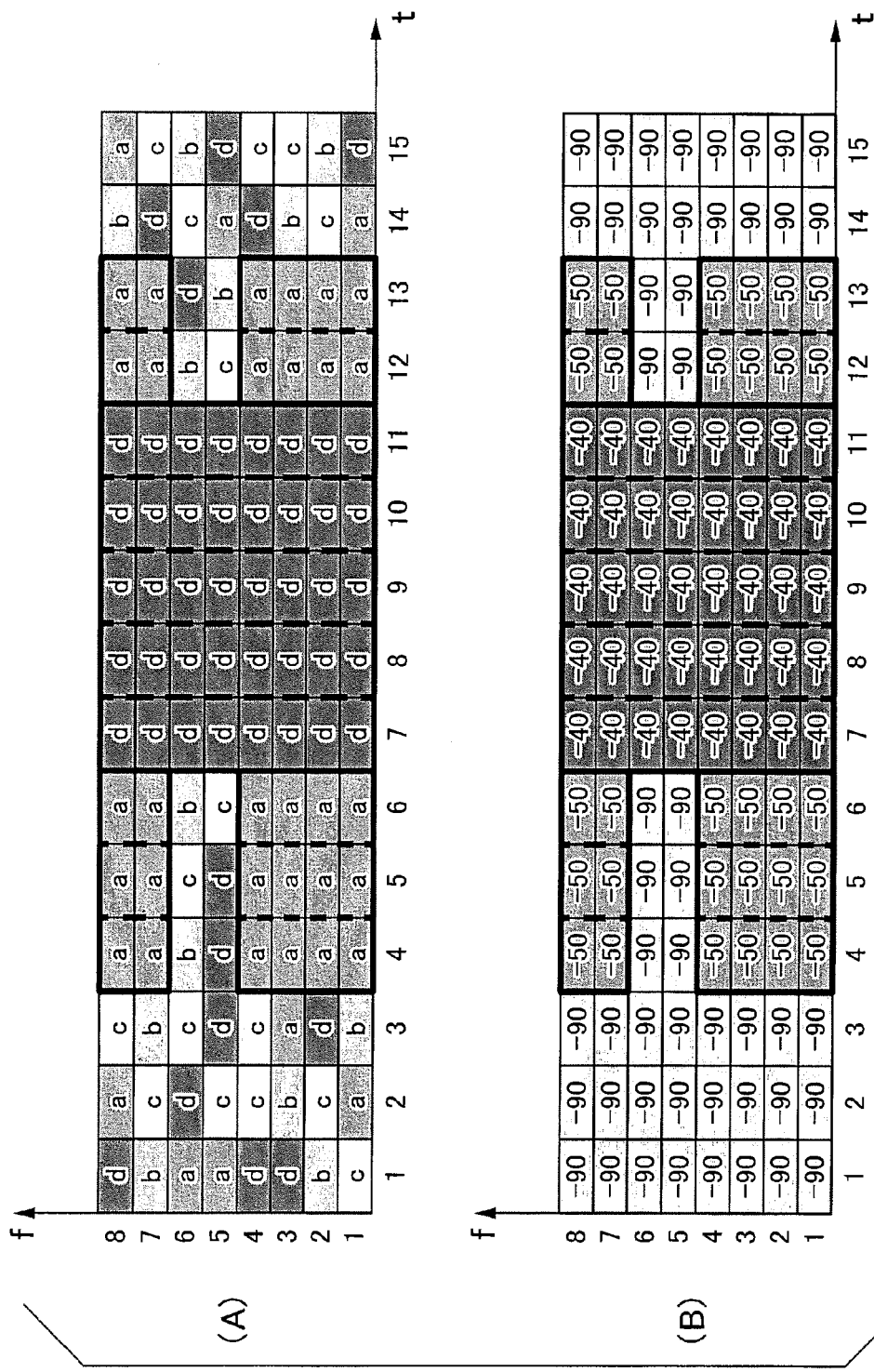
FIG. 9 shows diagrams illustrating yet another example of each of the selected antenna map and the signal intensity map.

FIGS. 9(A) and 9(B) illustrate yet another example of each of the selected antenna map and the signal intensity map. In the time indices 4-6, similarly to FIG. 6(A), the signal source can be determined to be the same because the number of elements with the antenna identifiers not being coincident between the time indices is "0" (a coincidence count is "8"). However, in the frequency indices 1-8, a signal intensity (−90 dB) at a noise level exists in the frequency indices 5-6 between the frequency indices 1-4 and the frequency indices 7-8. It can be therefore determined that the frequency indices 1-4 and the frequency indices 7-8 correspond to the signals coming from other signal source(s) that are different in frequency band to be used respectively. The same determinations as those described in FIGS. 6(A) and 6(B) can be applied to others. Although the examples in FIGS. 8 and 9 utilize the maximum signal intensity, the determination can be likewise made in the case of utilizing the minimum signal intensity. In this case, antenna selection information can be used as notch information of the fading.

The analysis processor 8 may output the result of the analysis process to the wireless communication circuit 201. The analysis processor 8 may also store the result of the analysis process in the storage instanced by the memory. The wireless communication circuit 201 may control the communications by making use of the result of the analysis process. For example, when the frame fails to be demodulated and when receiving an input of the analysis result of the interference signal from the analysis processor 8, a modulation method of at least one of the self-device and the communication partner device may be maintained as a present modulation method by dealing with the failure in the demodulation of this time as being caused by a temporary factor. When receiving the input of the analysis result of the fading, the modulation method of at least one of the self-device and the communication partner device may be changed to a stronger (lower transmission rate) modulation method. The time or timing may be synchronized by an arbitrary technique between the wireless communication circuit 201 and the wireless communication device 101. For example, the time required for the measurement process in the wireless communication device 101 may be acquired beforehand and used, and the wireless communication circuit 201 and the wireless communication device 101 may also apply timestamping.

Figure 10:
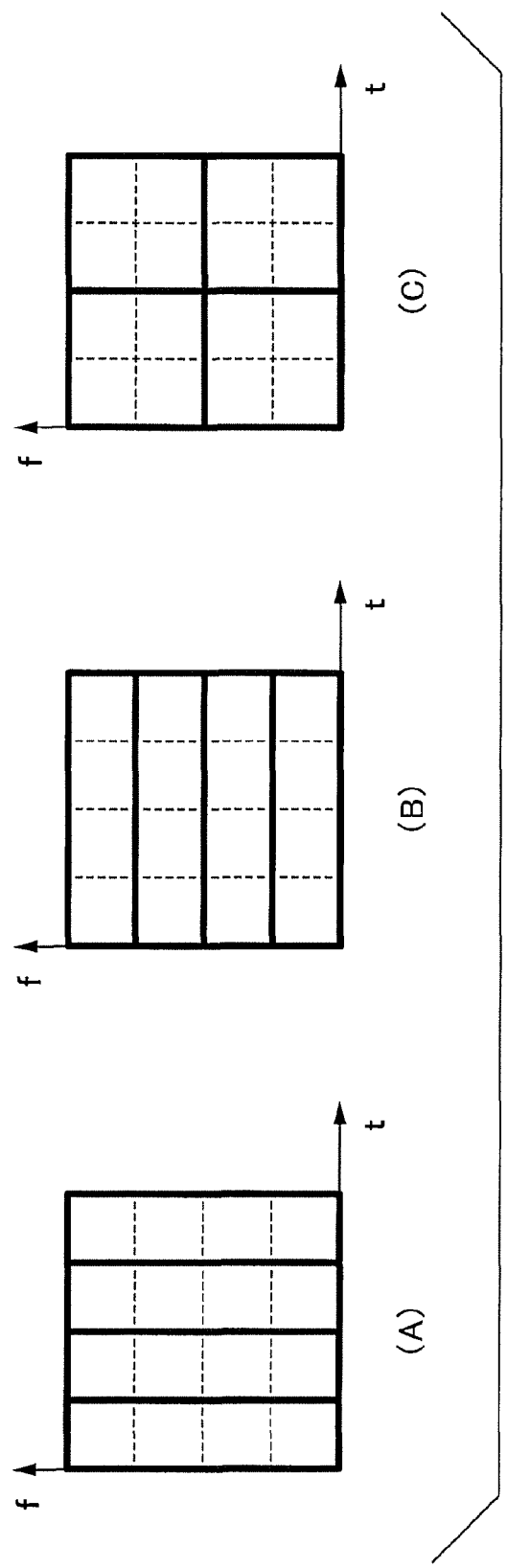
FIG. 10 shows diagrams illustrating an example of measuring the signal intensities of groups into which the plurality of elements is divided.

In the embodiment discussed so far, the signal intensity is measured per element. However, the signal intensity can be also measured per group by the plurality of elements being divided into groups. FIG. 10 illustrates three examples of grouping. As illustrated in FIG. 10(A), the plurality of elements adjacent to each other in the frequency direction may be joined, and, as illustrated in FIG. 10(B), the plurality of elements adjacent to each other in the timewise direction may also be joined. Alternatively, as depicted in FIG. 10(C), the plurality of elements may be grouped by joining the elements adjacent to each other in both of the frequency direction and the timewise direction. In this case, joint counts of the elements in the respective directions may be the same and may also be different. The signal intensities in the case of grouping may be a total value, an average value, a peak value (maximum value), or a median of signal intensities P of the elements belonging to the group. In the case of measuring the signal intensities of the groups into each of which plural elements is aggregated, it may be sufficient that the antenna selector 6 selects the antenna per group. The analysis processor 8 may simply execute processing not per element but per group.

Figure 11:
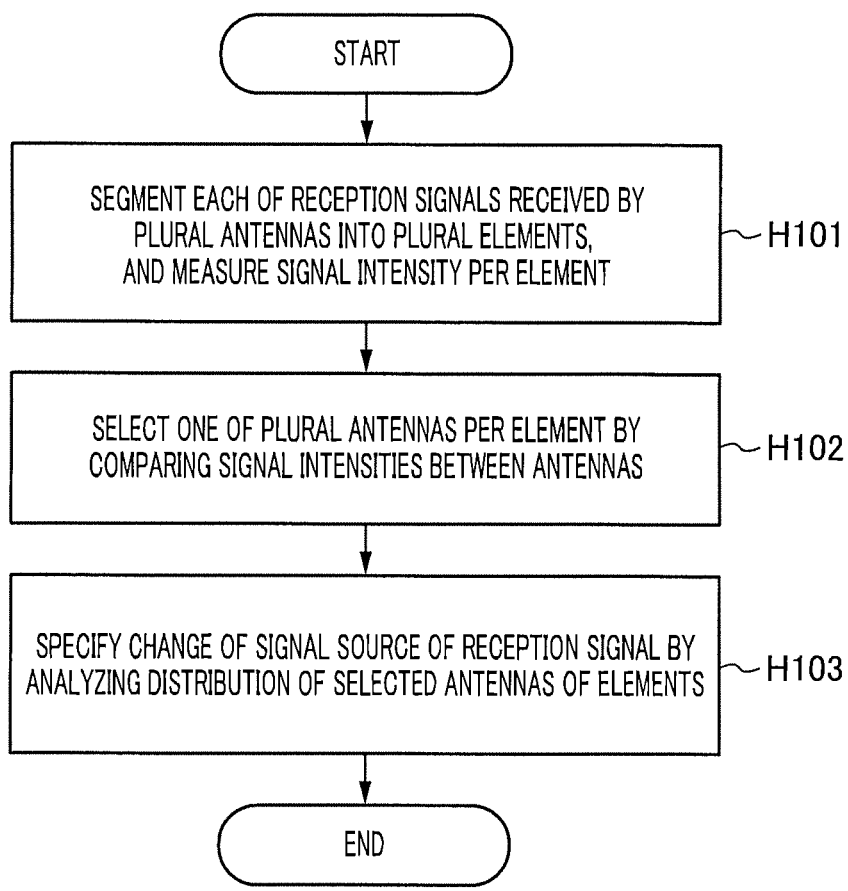
FIG. 11 is a diagram illustrating a flowchart of a signal measuring method according to the embodiment of the present invention.

FIG. 11 illustrates a flowchart of a signal measuring method according to the embodiment. The plurality of measurers 5 segments the respective reception signals received by the plurality of antennas into the plurality of elements defined by the time width and the bandwidth, and measures the signal intensities of the elements (or of the groups into which the plurality of elements is divided) for each of the reception signals (step H101).

The antenna selector 6 selects one of the plurality of antennas per element (or per group) by comparing the signal intensities of the elements between the plural antennas. The antenna selector 6 selects the antenna of the element exhibiting the highest signal intensity as one example (step H102).

The analysis processor 8 analyzes a distribution of the selected antennas of the elements (or the groups), thereby determining the identity of the signal source of the reception signals (step H103).

The embodiment discussed above is based on the premise that the analog processor and the A/D converter or other equivalent components cover the whole bands of the reception signals. However, when the bands to be sensed are broad bands, the bands are disabled from being all covered in terms of constraint of the bandwidths of the analog processor 2 and the A/D converter or other equivalent components. In this case, the signals of the broad band may be scanned by time-division (a setting of an analog filter or a digital filter is changed per scan according to the necessity).

In the embodiment discussed above, the signal intensities are measured by use of the frequency domain signal obtained by converting the reception signal into the frequency domain. However, the signal intensities of the bands or the frequency components may also be measured without being converted into the frequency domain but with the time domain signal. For instance, there is provided a plurality of filters for extracting the signals of the bands or the frequency components, and the signal intensities of the signals passing through each filter may also be measured.

The plurality of antennas 1 illustrated in FIG. 1 may be the antennas having the same property or different properties. The antennas having the different properties may be the antennas that are different in directivity and in polarization as well. The antennas having the same property may be non-directional antennas having the same structure, and may also be arranged in different positions. The antennas are enabled to take variations other than those described herein. The same is applied to an antenna 17 depicted in FIG. 14. The similar variations are applicable to between the antenna 1 and the antenna 17.

Figure 15:
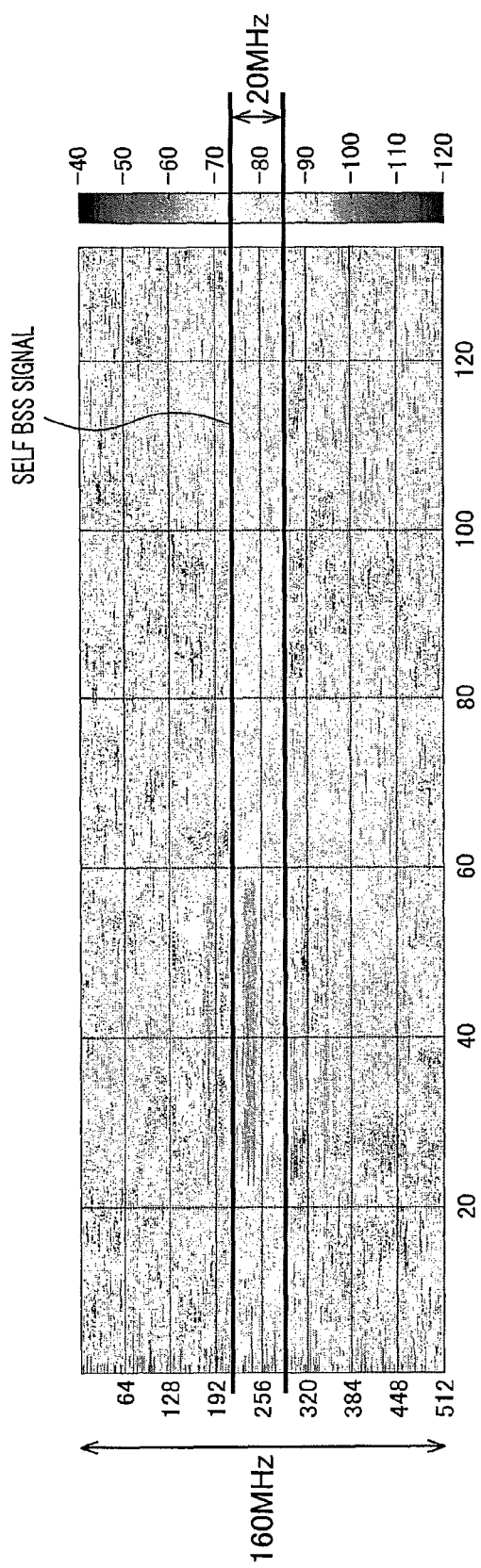
FIG. 15 is a diagram explaining an effect of the embodiment of the present invention.

As described above, according to the present embodiment, each of the signals received by the plurality of antennas is segmented into the plurality of elements; the signal intensities measured per element are compared between the plural antennas; one of the plurality of antennas is selected per element; the distribution of the selected antennas is analyzed; and the identity of the signal source of the reception signals can be thereby determined. For example, as illustrated in FIG. 15, when performing the communications in a 20 MHz bandwidth via the wireless LAN, the signal interference can be detected by analyzing the signals while sensing, as an assumption, a 160 MHz bandwidth. However, this entails time-division sensing, it is difficult to acquire an accurate spectrogram, and the processing becomes complicated. By contrast, the foregoing technique according to the present embodiment enables an interference conflict to be easily detected by analyzing only the signals in the 20 MHz bandwidth.

Second Embodiment

Figure 12:
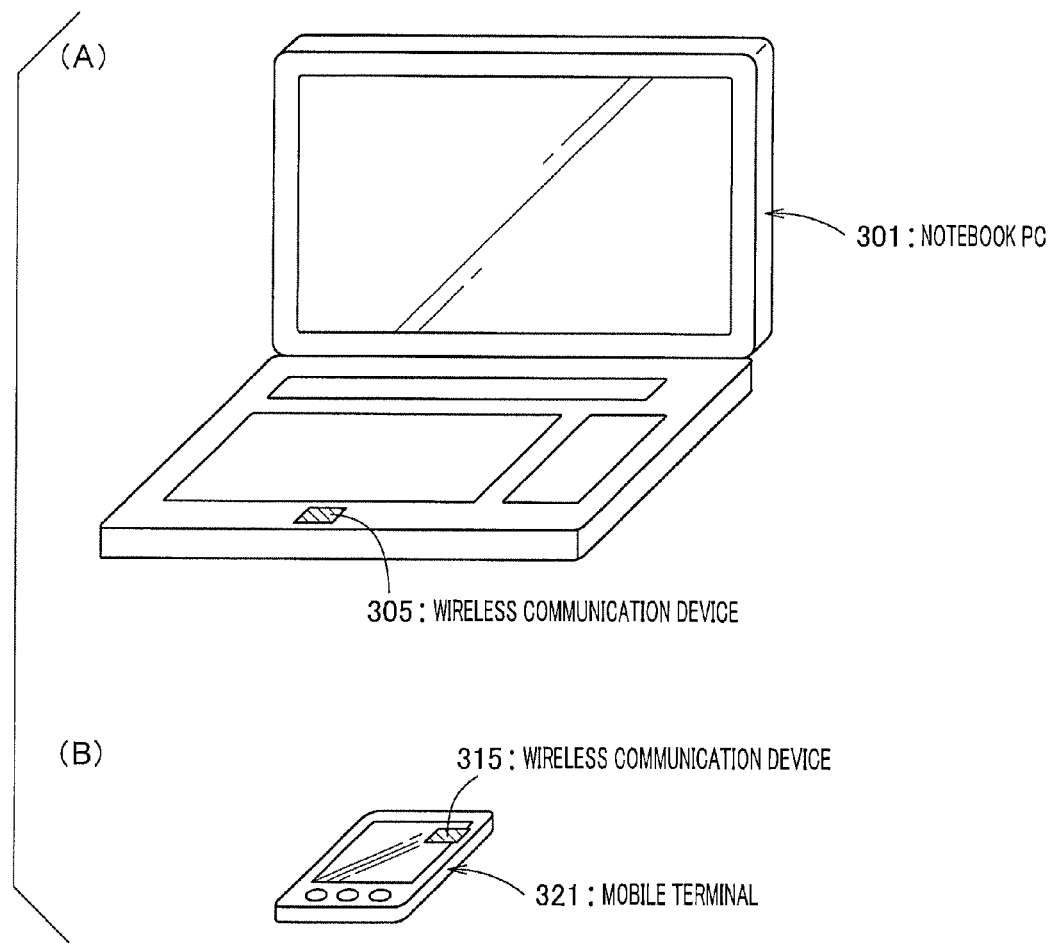
FIG. 12 show perspective views of a wireless terminal according to the embodiment of the present invention.

FIG. 12(A) and FIG. 12(B) are perspective views of wireless terminal according to the second embodiment. The wireless terminal in FIG. 12(A) is a notebook PC 301 and the wireless communication device in FIG. 12(B) is a mobile terminal 321. The notebook PC 301 and the mobile terminal 321 are equipped with wireless communication devices 305 and 315 respectively. For the wireless communication devices 305 and 315, it is possible to use the wireless communication device provided in a wireless terminal, an access point which have been described above or both of them. The wireless terminal equipped with the wireless communication device is not limited to the notebook PC and the mobile terminal. For example, it can be provided in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 13:
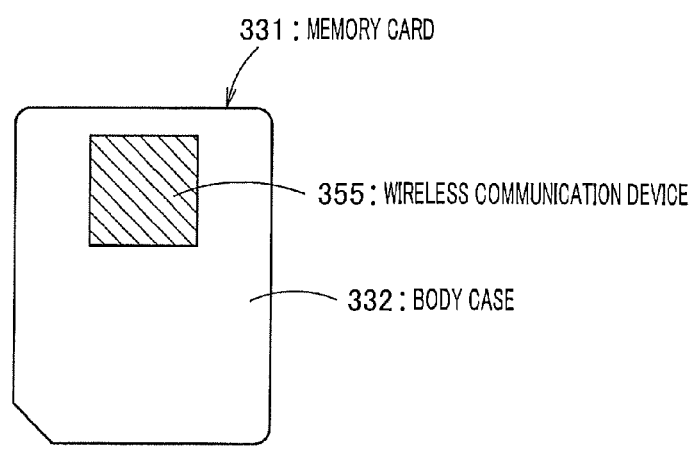
FIG. 13 is a diagram illustrating a memory card mounted with the wireless communication device according to the embodiment of the present invention.

Moreover, a wireless communication device installed in a terminal or an access point can also be installed in a memory card. FIG. 13 illustrates an example of mounting the wireless communication device on the memory card. A memory card 331 includes a wireless communication device 355 and a body case 332. The memory card 331 uses the wireless communication device 355 for wireless communication with an external device (a wireless terminal, an access point or both of them, etc.). Here, in FIG. 13, the description of other elements (for example, a memory, and so on) in the memory card 331 is omitted.

Third Embodiment

In the third embodiment, a bus, a processor unit and an external interface unit are provided in addition to the configuration of the wireless communication device according to according to any one of the above-described embodiments. The processor unit and the external interface unit are connected with a buffer through the bus. Firmware operates in the processor unit. Thus, by adopting a configuration in which the firmware is included in the wireless communication device, it becomes possible to easily change the function of the wireless communication device by rewriting the firmware. The processing unit in which the firmware operates may be a processor that performs the process of the communication controlling device or the controller according to the present embodiment, or may be another processor that performs a process relating to extending or altering the functions of the process of the communication controlling device or the controller. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Fourth Embodiment

In the fourth embodiment, a clock generating unit is provided in addition to the configuration of the wireless communication device according to according to any one of the above-described embodiments. The clock generating unit generates a clock and outputs the clock from an output terminal to the external of the wireless communication device. Thus, by outputting the clock generated in the wireless communication device to the external and operating the host side by means of the clock output to the external, it becomes possible to operate the host side and the wireless communication device side in a synchronized manner.

Fifth Embodiment

In the fifth embodiment, a power source unit, a power source controlling unit and a wireless power feeding unit are included in addition to the configuration of the wireless communication device according to any one of the above-described embodiments. The power supply controlling unit is connected with the power source unit and the wireless power feeding unit, and performs control to select a power source supplied to the wireless communication device. Thus, by adopting a configuration in which the power source is included in the wireless communication device, power consumption reduction operations that control the power source become possible.

Sixth Embodiment

In the sixth embodiment, a SIM card is included in addition to the configuration of the wireless communication device according to any one of the above-described embodiments. For example, the SIM card is connected may be connected to the wireless communication circuitry 201, the wireless communication device 101 or a plurality of them. Thus, by adopting a configuration in which the SIM card is included in the wireless communication device, it becomes possible to easily perform authentication processing.

Seventh Embodiment

In the seventh embodiment, a video image compressing/decompressing unit is included in addition to the configuration of the wireless communication device according to any one of the above-described embodiments. The video image compressing/decompressing unit is connected with a bus. Thus, by adopting a configuration in which the video image compressing/decompressing unit is included in the wireless communication device, it becomes possible to easily transmit a compressed video image and decompress a compressed video image received.

Eighth Embodiment

In the eighth embodiment, an LED unit is included in addition to the configuration of the wireless communication device according to any one of the above-described embodiments. For example, the LED unit is connected with may be connected to the wireless communication circuitry 201, the wireless communication device 101 or a plurality of them. Thus, by adopting a configuration in which the LED unit is included in the wireless communication device, it becomes possible to easily notify the operation state of the wireless communication device to the user.

Ninth Embodiment

In the ninth embodiment, a vibrator unit is included in addition to the configuration of the wireless communication device according to any one of the above-described embodiments. For example, the vibrator unit is connected may be connected to the wireless communication circuitry 201, the wireless communication device 101 or a plurality of them. Thus, by adopting a configuration in which the vibrator unit is included in the wireless communication device, it becomes possible to easily notify the operation state of the wireless communication device to the user.

Tenth Embodiment

In a tenth embodiment, the configuration of the wireless communication device includes a display in addition to the configuration of the wireless communication device according to any one of the above-described embodiments. The display may be connected to the controller (101 or 201) of the wireless communication device via a bus (not shown). As seen from the above, the configuration including the display to display the operation state of the wireless communication device on the display allows the operation status of the wireless communication device to be easily notified to a user.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device comprising:
   a receiver configured to receive signals via a plurality of antennas; and
   processing circuitry configured to:
      segment each of the signals into a plurality of elements each defined by a time width and a bandwidth, and measure signal intensities of the elements or groups into which the plurality of elements are divided;
      select one of the plurality of antennas for each element or for each group by comparing the signal intensities between the plurality of antennas to obtain a distribution of selected antennas of the plurality of antennas; and
      analyze the distribution of the selected antennas to determine an identity of a signal source of the signals.

2. The wireless communication device according to claim 1, wherein the processing circuitry is configured to determine the identity of the signal source of the signals by further analyzing a distribution of the signal intensities of the selected antennas.

3. The wireless communication device according to claim 1, wherein the processing circuitry is configured to determine the identity of the signal source between a first time period and a second time period by comparing a distribution of the selected antennas in a first time period of the time width and a distribution of the selected antennas in a second time period of the time width.

4. The wireless communication device according to claim 3, wherein the processing circuitry is configured to compare the selected antennas between the first time period and the second time period, and determine the identity of the signal source according to a number of elements or a number of groups for which the selected antennas are not coincident.

5. The wireless communication device according to claim 4, wherein the processing circuitry is configured to determine there is no identity of the signal source between the first time period and the second time period when the number of elements or the number of groups is equal to or larger than a threshold value.

6. The wireless communication device according to claim 3, wherein the control circuitry is configured to detect, each of the first time period and the second time period, at least one of bandwidth, a central frequency and reception power of the signal of the selected antenna, and compare detected bandwidths or central frequencies or reception powers to determine the identity of the signal source of the signals.

7. The wireless communication device according to claim 1, wherein the processing circuitry, as the determination of the identity of the signal source, detects whether a number of signal sources increases, whether a number of signal sources decreases, whether a signal source changes to another signal source, and whether the signal source is same.

8. The wireless communication device according to claim 1, wherein the processing circuitry is configured to detect whether a radio propagation environment of the signals has changed in a case that the signal source of the signals are same.

9. The wireless communication device according to claim 1, wherein the processing circuitry measures the signal intensities, based on frequency domain signals acquired by converting the signals into a frequency domain.

10. The wireless communication device according to claim 9, wherein the frequency domain signal contains a plurality of frequency components,
   each of the plurality of elements corresponds to one different frequency component of the plurality of frequency components, and
   the processing circuitry is configured to measure a signal intensity of the frequency component as the signal intensity of the element.

11. The wireless communication device according to claim 9, wherein the processing circuitry is configured to measure, as the signal intensity of the group, a total value, an average value, a median, or a maximum value of the signal intensities of the elements contained in the group.

12. The wireless communication device according to claim 1, further comprising the plurality of antennas.

13. A signal measuring method comprising:
   segmenting each of signals received by a plurality of antennas into a plurality of elements each defined by a time width and a bandwidth, and measuring signal intensities of the elements or groups into which the plurality of elements are divided;
   selecting one of the plurality of antennas for each element or for each group by comparing the signal intensities between the plurality of antennas to obtain a distribution of selected antennas of the plurality of antennas; and
   analyzing the distribution of the selected antennas to determine an identity of a signal source of the signals.

14. The signal measuring method according to claim 13, further comprising: determining the identity of the signal source of the signals by further analyzing a distribution of the signal intensities of the selected antennas.

15. The signal measuring method according to claim 13, further comprising: determining the identity of the signal source between a first time period and a second time period by comparing a distribution of the selected antennas in a first time period of the time width and a distribution of the selected antennas in a second time period of the time width.

16. The signal measuring method according to claim 15, further comprising: comparing the selected antennas between the first time period and the second time period, and determine the identity of the signal source according to a number of elements or a number of groups for which the selected antennas are not coincident.

17. The signal measuring method according to claim 16, further comprising: determining there is no identity of the signal source between the first time period and the second time period when the number of elements or the number of groups is equal to or larger than a threshold value.

18. The signal measuring method according to claim 15, further comprising: detecting, each of the first time period and the second time period, at least one of bandwidth, a central frequency and reception power of the signal of the selected antenna, and comparing detected bandwidths or central frequencies or reception powers to determine the identity of the signal source of the signals.

19. The signal measuring method according to claim 13, further comprising: detecting, as the determination of the identity of the signal source, whether a number of signal sources increases, whether a number of signal sources decreases, whether a signal source changes to another signal source, and whether the signal source is same.

20. The signal measuring method according to claim 13, further comprising: detecting whether a radio propagation environment of the signals has changed in a case that the signal source of the signals are same.

* * * * *